United States Patent

Johnson

[15] 3,690,299
[45] Sept. 12, 1972

[54] PET DOOR APPARATUS

[72] Inventor: Frances H. Johnson, P.O. Box 643, Northridge, Calif. 91324

[22] Filed: March 29, 1971

[21] Appl. No.: 129,063

[52] U.S. Cl. .......................... 119/1, 49/169, 119/19, 160/DIG. 8, 160/354
[51] Int. Cl. ............................................... A01k 1/02
[58] Field of Search ...... 160/354; 119/16, 17, 18, 19, 119/29; 49/169

[56] References Cited

UNITED STATES PATENTS

| 2,560,661 | 7/1951 | Poovey | 119/19 X |
| 2,758,646 | 8/1956 | Johnson | 160/354 |

*Primary Examiner*—Aldrich F. Medbery
*Attorney*—Jessup & Beecher

[57] ABSTRACT

A pet door apparatus having an open frame to which is swingably secured a door, the door being capable of swinging loose in either direction with respect to the frame, a substantially U-shaped border element attached to the frame adjacent the end of each leg of the border element, the border element to swing only in one direction along with the door and remain in contact with the frame during the swinging movement of the door in the opposite direction, a slot located within each leg in the area of the attachment to permit the border element to become disconnected from the frame upon application of sufficient force.

7 Claims, 5 Drawing Figures

PATENTED SEP 12 1972

3,690,299

*INVENTOR.*
FRANCES H. JOHNSON
BY JESSUP & BEECHER
Warren T. Jessup
ATTORNEYS

PET DOOR APPARATUS

BACKGROUND OF THE INVENTION

The field of this invention relates to a door apparatus particularly adapted for the passage of small animals such as dogs and cats, and more particularly to a door apparatus which is to be located within a house or other human being living structure which gives a domesticated animal freedom of movement to move at will indoors or outdoors.

The apparatus of this invention constitutes an improvement upon the pet door apparatus defined within U.S. Pat. No. 2,758,646, patented Aug. 14, 1956, entitled DOOR STRUCTURE, by Don D. Johnson.

It is the objective of all pet doors such as defined in the foregoing patent to adequately keep out the elements while still permitting the passage of the small animals therethrough without human assistance. The pet door structure defined by the above referred to patent satisfactorily accomplishes the objective of not permitting the elements to enter the house while also giving the animal freedom of movement. However, it has been discovered in a small number of instances that injury, which could result in death of the animal, might occur if the animal passes through the door in a certain manner.

It has been found that if the animal contacts the door at a great enough velocity and at a certain angle, that it is possible that the animal may become caught between the border element and the door. Once the animal has become caught, the animal frequently panics and exerts a greater force to become disentangled. However, with the border element of the aforementioned patent, the border element is held fast to the frame and is not normally capable of being disassociated therefrom. As the animal continues to exert greater force upon the border element, the animal may effect substantial injury to himself.

SUMMARY OF THE INVENTION

The apparatus of this invention is basically similar to the door structure shown and described in the aforementioned patent. The border element of the aforesaid patent is shown substantially rectangular in configuration with a centrally located cutout portion to permit the animal to pass therethrough. The border element of this invention contemplates employing a substantially U-shaped border element wherein only the ends of each of the legs of the U-shaped border element are to be attached to the frame. The attachment to the frame of each of the legs is to be by conventional fastening means such as a screw or a bolt. A slot is located within each leg between the free end of the leg and the fastening means. As a result, upon a sufficient force being exerted on the border element of this invention, the fastening means within each leg is permitted to pass through its respective slot thereby permitting disassociation of the border element with respect to the frame.

DETAILED DESCRIPTION OF THE SHOWN EMBODIMENT

Figure 1:
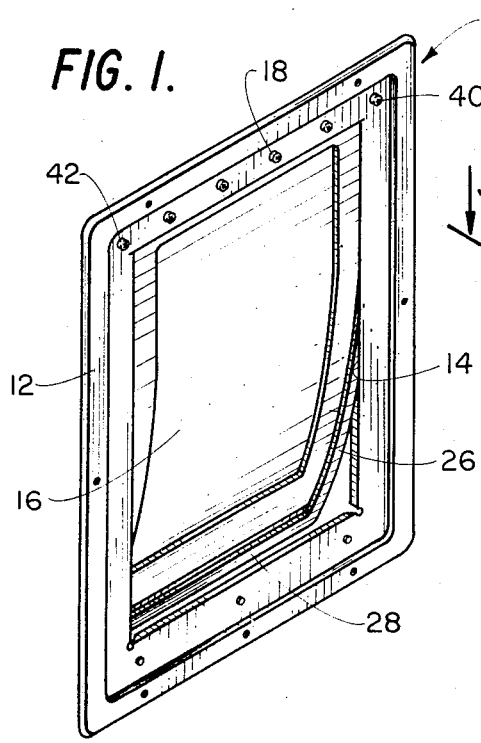
FIG. 1 is a front perspective view of the apparatus of this invention.
Figure 2:
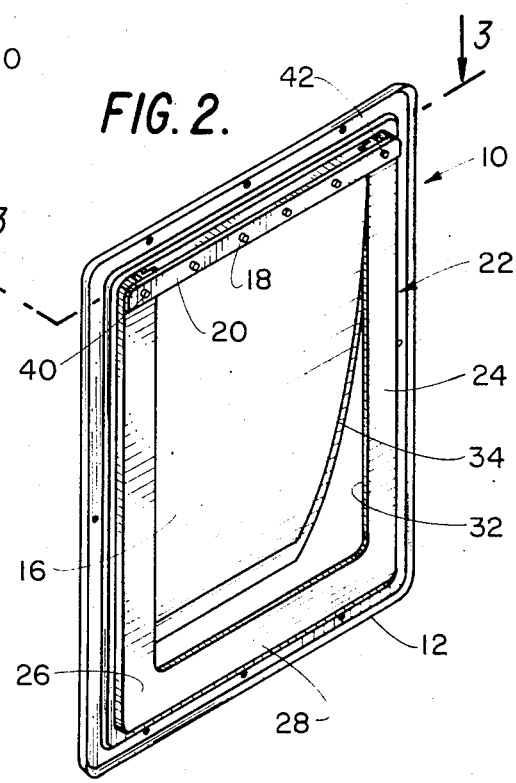
FIG. 2 is a back perspective view of the apparatus of this invention.
Figure 3:
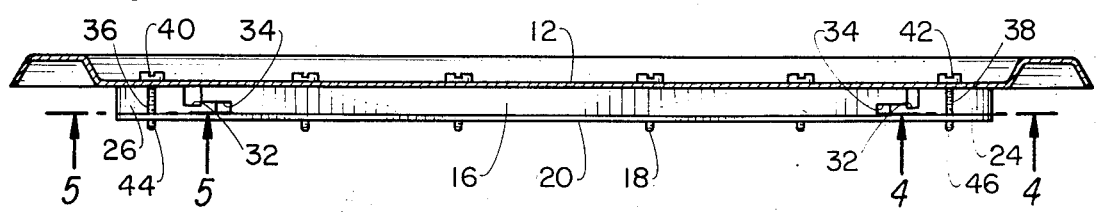
FIG. 3 is a partly-in-cross section view through the apparatus of this invention taken along line 3—3 of FIG. 2.
Figure 4:
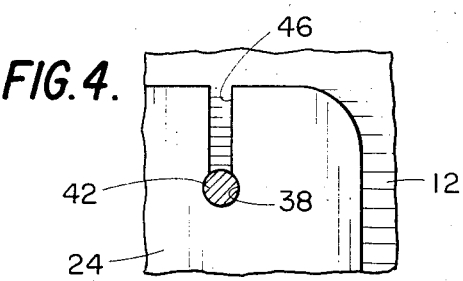
FIG. 4 is a fragmentary, partly-in-section view taken along line 4—4 of FIG. 3.
Figure 5:
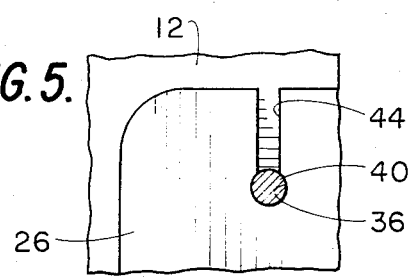
FIG. 5 is a fragmentary, partly-in-section view taken along line 5—5 of FIG. 3.

Referring particularly to the drawing, there is shown in FIG. 1 the apparatus 10 of this invention including a rectangularly shaped frame 12 which includes a rectangularly shaped opening 14 therein. The opening 14 is to be of a sufficient size so as to readily permit a domesticated animal such as a dog or a cat to pass therethrough. It is to be understood that the apparatus 10 of this invention could be formed in a plurality of different sizes such as a size for small dogs and cats, a size for medium size dogs, and a size for larger size dogs. However, it is to be understood that one size could be employed for all sized animals.

The frame 12 is to be fixedly secured within the structure constituting the living quarters for a human being. For example, the frame 12 could be secured within an opening in a wall of a house or apartment, or the frame 12 could be located within a cutout opening within a door into the house or apartment. It is normally desirable that the apparatus 10 of this invention be mounted so as to be spaced a predetermined distance from the floor. It is normally desirable that a 3 or 4 inch displacement from the floor is desirable.

A door 16 is adapted to fit in a tight fitting manner within the confines of opening 14. It is desirable that the door 16 be formed as a substantially homogeneous sheet of flexible material such as thick rubber, natural or synthetic. Flexible plastic material may also be used. The door 16 is secured at its upper edge to the frame 12 by means of fasteners 18. The free end of the fasteners 18 are to threadingly cooperate with an attaching plate 20. The fasteners 18 are to be tightened sufficiently so as to bind the upper edge of the door 16 between the attaching plate 20 and the frame 12. The mounting of the door 16 is to be such so that the door 16 may be swung back and forth about its upper edge mounting. Because the door 18 is of a size less than the opening 14, the door 16 may be swung either in the forward direction or in the aft direction through the opening 14.

Located on the back side of the apparatus 10 is a border element 22. Basically the border element 22 is substantially U-shaped in configuration resulting in the forming of a first leg 24 which is substantially parallel to the second leg 26 with an apex or connecting element 28 being connected therebetween. The border element is to also be constructed of a material similar to the door 16. The opening 30 defined in between the legs 24 and 26 and the apex element 28 is of a slightly smaller size than the opening 14. The portion of the border element located directly adjacent the opening 30 is relieved to form a flange 32. Flange 32 is to be cooperatable with a flange 34 formed on the door 16. It is normally desirable that with the apparatus 10 in the inoperative position, that the border element 22 be held by a slight force in cooperation with the frame 12. This holding action can be readily accomplished by the use of magnets which are embedded within the border element 22. Additionally, when in the inoperative position, it is desirable that the door 16 in the area of the flange 34 be held in a tight fitting manner adjacent the flange 32 of the border element 22. This can be readily accomplished by locating a pair of spaced apart magnets within the door 16 in the area of the flange 34 adjacent the swinging edge thereof. A pair of cooperating steel elements are also to be located within the flange 32 of the border element 22.

Adjacent the free end of the leg 26 is an aperture 36. Similarly, adjacent the free end of the leg 24 is an aperture 38. A fastener 40, such as a screw or bolt is to cooperate within the aperture 36 to bind the upper end of the leg 26 between the attaching plate 20 and the frame 12. Similarly, a fastener 42 is to be located through the aperture 38 and function to bind the upper end of the leg 24 between the frame 12 and the attaching plate 20. A slot 24 is located within the leg 26 and connects aperture 36 to the end of the leg 26. Similarly, a slot 46 is located within the leg 24 and connects the aperture 38 to the end of the leg 24. It is to be noted that each of the slots 44 and 46 are of a width which is less than the diameter of their respective fasteners 40 and 42 which are located within the respective apertures 36 and 38. The reason for this will become apparent in the discussion of the operation of the apparatus of this invention.

The operation of the apparatus 10 of this invention is as follows: It will be assumed that the apparatus 10 has been mounted within a structure such as a wall of a house or the door of a house. For the animal to pass through the apparatus 10 from inside the house to outside of the house, the animal contacts the front side of the door 16 and physically overcomes the force created by the magnets and causes the door 16 to swing outwardly along with the border element 22 permitting the animal to pass through the opening 14 and therefore exteriorally of the house. If the animal then wishes to come within the house the animal need only to physically contact the backside of the door 16, overpowering the magnets, causing the door to swing inwardly permitting the animal to pass through the opening 14 to the interior of the house. It is to be noted that during this inward movement, the border element 22 is maintained in contact with the frame 12.

Now let it be assumed in a rare situation that the flanges 32 and 34 have become disassociated with one another causing the door 16 to be moved on the backside of the border element 22. This situation can possibly occur if the animal strikes the door 16 in an outward direction with substantial force. Let it further be assumed that as a result the animal has become caught between the lower edge of the door 16 and the apex element 28 of the border element 22. Under normal circumstances, whatever the animal would attempt to do would only tend to make matters worse by increasing the binding force between the door 16 and the apex element 28. The normal reaction for the animal is to run away or exert a greater force tending to separate the border element 22 from the frame 12. Within the aforementioned patent, such separation would not be possible. However, within this invention each of the legs 24 and 26 are secured to the frame only by the respective fasteners 42 and 40 which cooperate within the respective apertures 38 and 36. This separation force causes each slot 46 and 44 to expand slightly and permit their respective fasteners 42 and 40 to pass therethrough. As a result, the border element 22 can be completely removed out of cooperation with the frame 12 when encountered by an unnatural force situation, thereby freeing the animal.

Additionally, under normal conditions said separation is not possible. Further, if the border element 22 has become separated from the frame 12, it is a simple procedure to replace each of the legs 24 and 26 back in the original position between the attaching plate 20 and the frame 12. Once having been replaced, the border element 22 will remain in this position until such again encounters an abnormal force situation.

What is claimed is:

1. A pet door apparatus comprising:
   a frame having a central opening to permit passage of an animal therethrough;
   a door secured at an edge thereof to said frame, said door being swingably mounted to swing in either the fore or aft direction with respect to said frame;
   a border element connected to said frame, and movable along with said door upon said door swinging in the aft direction, said border element including means which, upon encountering an abnormal condition are capable of becoming disconnected from said frame.

2. Apparatus as defined in claim 1 wherein:
   said border element is substantially U-shaped and has
   a first leg, a second leg substantially parallel thereto, and a connecting element connecting said legs, and
   a fastener passing through each of said legs to effect the connection of said legs to said frame.

3. Apparatus as defined in claim 1 wherein:
   said means includes a slot formed within each of said legs, each of said slots extending between a respective fastener and the exterior of the free end of its respective leg.

4. Apparatus as defined in claim 3 wherein:
   the width of each of said slots is less than the width of its respective fastener.

5. Apparatus as defined in claim 4 wherein:
   said border element is connected to said frame directly adjacent the securement of said door to said frame.

6. Apparatus as defined in claim 5 wherein:
   said door is formed of a flexible hard rubber material.

7. Apparatus as defined in claim 6 wherein:
   said border element is formed of a flexible hard rubber material.

\* \* \* \* \*